United States Patent [19]

DuVall

[11] 4,355,273
[45] Oct. 19, 1982

[54] SERVO CAPTURE SYSTEM

[75] Inventor: Wilbur E. DuVall, Victorville, Calif.

[73] Assignee: Xerox Corporation, Stamford, Conn.

[21] Appl. No.: 187,264

[22] Filed: Sep. 15, 1980

[51] Int. Cl.³ .............................................. G05B 13/00
[52] U.S. Cl. .................................... 318/561; 318/592; 318/594; 360/78
[58] Field of Search ....................... 318/561, 592, 594; 360/78

[56] References Cited

U.S. PATENT DOCUMENTS 3,721,882  3/1973  Helms .................................. 318/594

Primary Examiner—B. Dobeck
Attorney, Agent, or Firm—Leonard Zalman

[57] ABSTRACT

Settling problems of a closed loop servo system are substantially eliminated by switching the servo system into position mode operation only when there is zero position error and zero velocity error. The fast and clean settling is accomplished by digitizing the instantaneous amplitude of the position signal when the difference count has decremented to zero and using that digital value as the address of a square root look up table which provides for each instantaneous amplitude of the position signal a digital signal indicative of the instantaneous velocity required to effect rapid settling at the rest position. The digitized velocity signal is converted to an analog signal by a digital to analog converter for energization of the drive motor. The servo system tracks the instantaneous amplitude of the position signal until both position signal amplitude and velocity are zero, at which time the system is mechanically stopped and stable, and then the system is, for the first time, switched to conventional position mode operation. Prior to the time that the difference count is decremented to zero, the difference or track count is used as the address of the look up table to provide digitized velocity signals. There is a change in the scale of the digital to analog converter when the difference count becomes zero so that all of the velocity square root curve used for positioning when the difference count was above zero can be used when the difference count is zero.

3 Claims, 5 Drawing Figures

4,355,273

SERVO CAPTURE SYSTEM

BACKGROUND OF THE INVENTION

Closed loop servo systems have long been used to rapidly position magnetic read/write heads, print wheels and carriages and other devices. One such servo system is described in U.S. Pat. No. 3,663,880 wherein a difference count establishes how many data tracks a read/write head must move past to reach a desired data track. The difference count is decremented by one count as the head moves past each data track, with the difference count eventually being decremented to zero. Prior to the time that the difference count is decremented to zero, the motor providing the drive for the read/write head is energized by a signal indicative of the instantaneous velocity of the motor shaft providing support for the head.

In systems like the patented system, a critical phase of operation is when the difference count has decremented to zero and there is still a fractional count left. The normal procedure, as described in the referenced patent, is to then switch to position mode operation wherein the motor drive is energized with a signal indicative of the position of the motor shaft providing support for the head. However, even when the difference count has decremented to zero, there is a positional error as well as a velocity error. Those errors put a transient into the system and the head does not settle fast and clean, that is, the head toggles up and back about the desired track before coming to rest.

SUMMARY OF THE INVENTION

In accordance with the invention, settling problems of a closed loop servo system are substantially eliminated by switchihg the servo system into position mode operation only when there is zero position error and zero velocity error. The fast and clean settling is accomplished by digitizing the instantaneous amplitude of the position signal when the difference count has decremented to zero and using that digital value as the address of a square root look up table which provides for each instantaneous amplitude of the position signal a digital signal indicative of the instantaneous velocity required to effect rapid settling at the rest position. The digitized velocity signal is converted to an analog signal by a digital to analog converter for energization of the drive motor. The servo system tracks the instantaneous amplitude of the position signal until both position signal amplitude and velocity are zero, at which time the system is mechanically stopped and stable, and then the system is, for the first time, switched to conventional position mode operation. Being in the position mode when the system is stopped and stable provides the system with greater stiffness than would occur if the system would remain in the velocity mode.

Prior to the time that the difference count is decremented to zero, the difference or track count is used as the address of the look up table to provide digitized velocity signals. There is a change in the scale of the digital to analog converter when the difference count becomes zero so that all of the velocity square root curve used for positioning when the difference count was above zero can be used when the difference count is zero.

DETAILED DESCRIPTION OF THE DRAWINGS

DETAILED DESCRIPTION OF THE INVENTION

The closed loop servo system of the invention will be described in relation to the positioning of a magnetic read/write head of a data storage system. However, it is not intended that the servo system of the invention be so limited since it is equally applicable to positioning print wheels and carriages and other members and devices.

Figure 1A:
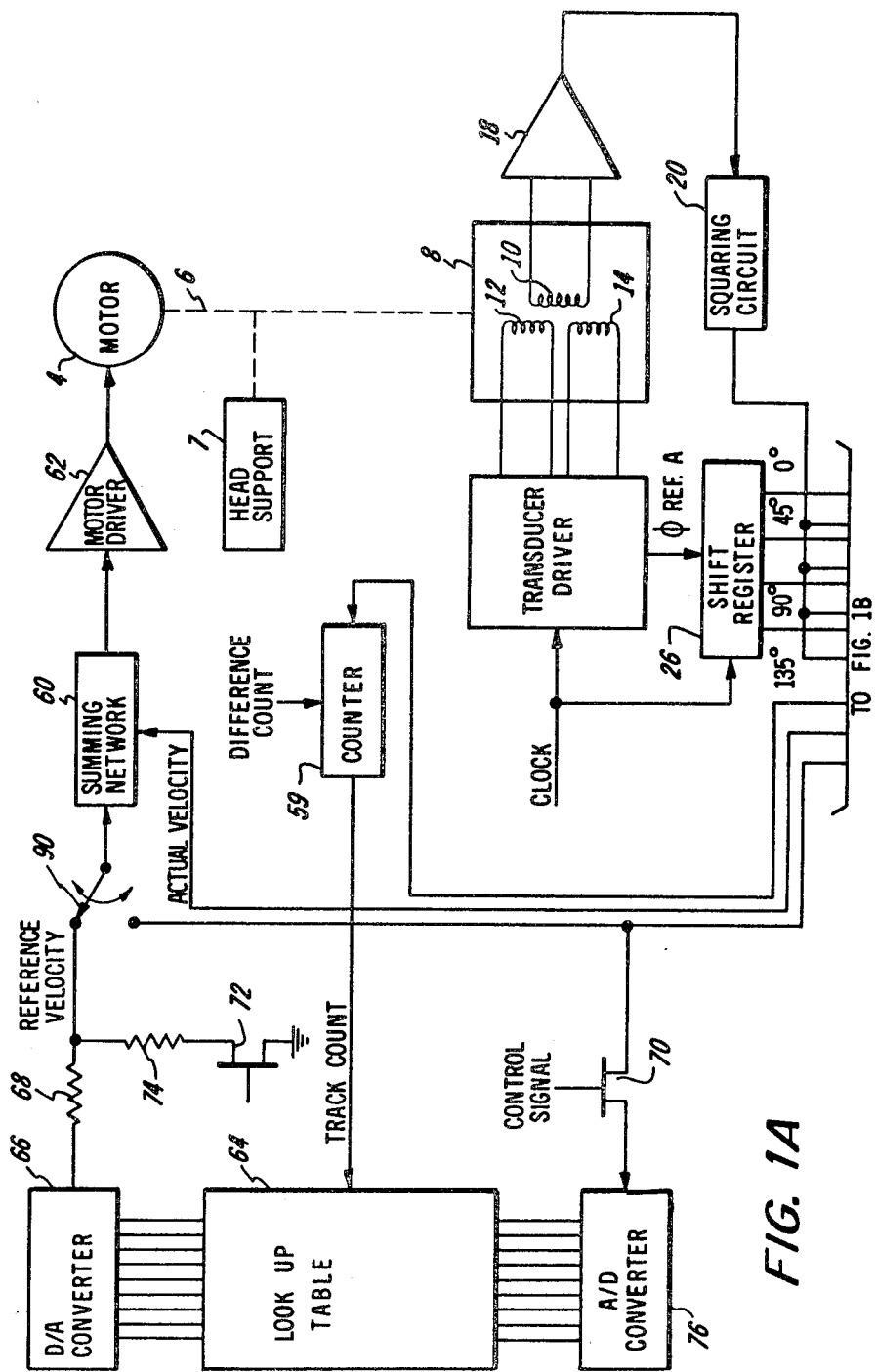
FIG. 1 is a schematic/block circuit diagram of the closed loop servo system of the invention.
Figure 1B:
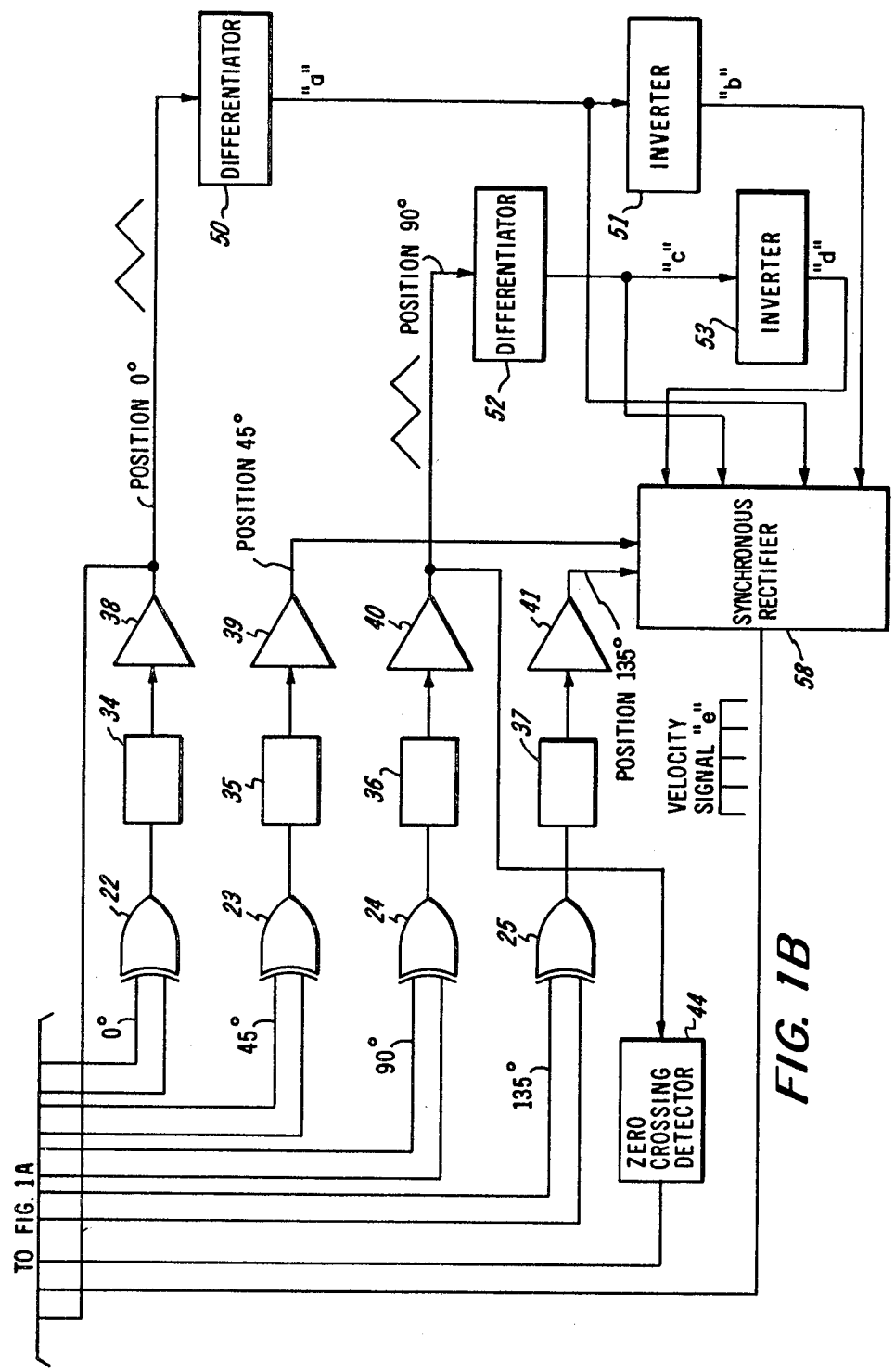

Referring to FIG. 1, a motor 4 is indicated as driving a shaft 6 which is coupled to a magnetic read/write head support 7. Shaft 6 is coupled also to a conventional Inductosyn transducer 8 having a fixed stator disk and a rotary disk. In general, the rotory disk includes deposited metallic parallel conductors in the form of a rotor winding 10 and the stator disk includes deposited metallic parallel conductors in the form of two stator windings 12 and 14 in space quadrature to each other, with each conductor carrying current in a direction opposite to that of the adjacent conductor.

Figure 2:
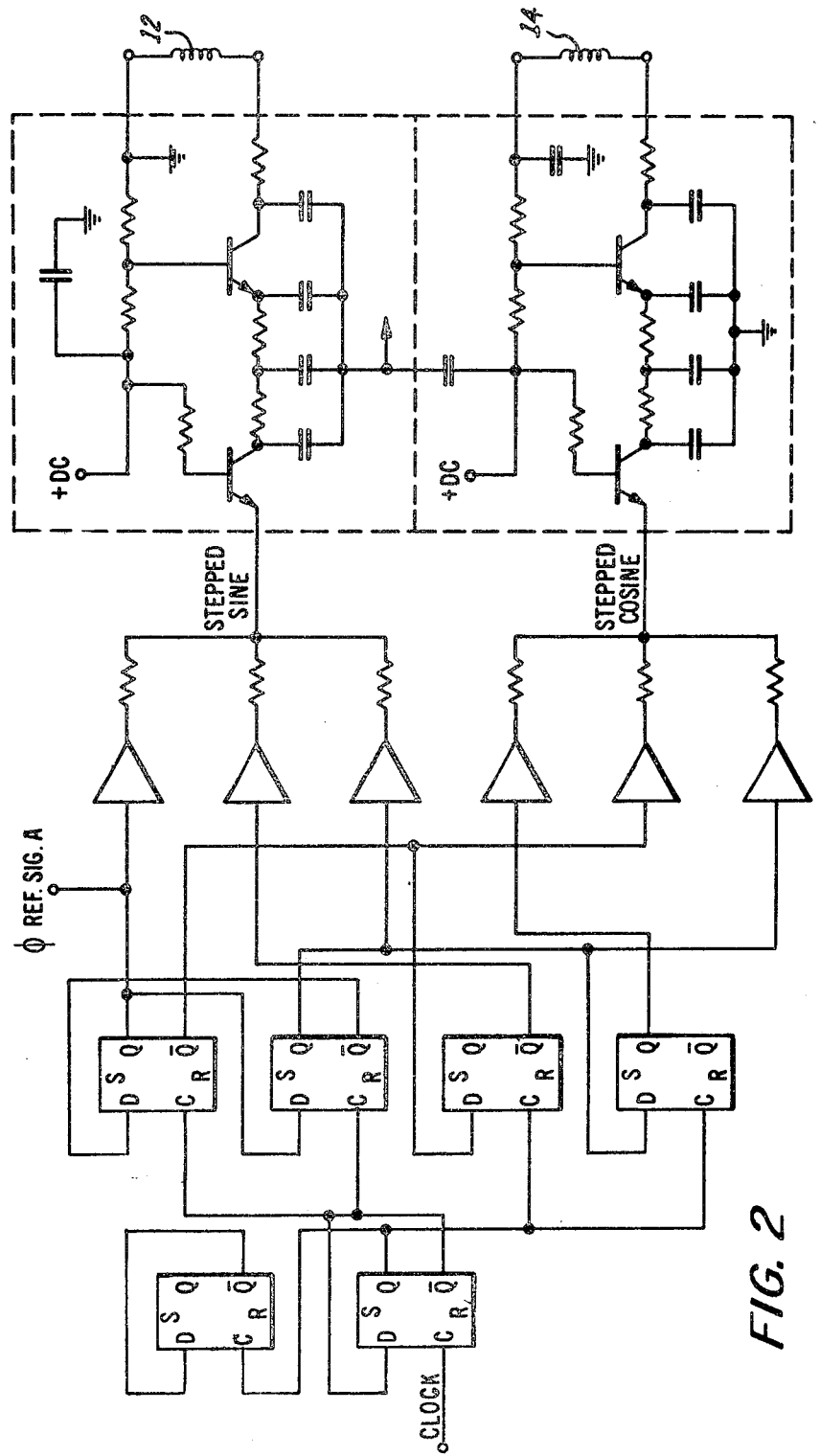
FIG. 2 is a schematic/block circuit diagram of a component of the servo system of FIG. 1.

Referring now also to FIG. 2, a driver circuit for the transducer receives as an input a clock signal and produces at a first output a sine wave signal which is supplied to one stator winding, at a second output a cosine wave signal which is supplied to the other stator winding, and at a third output a square wave signal designated as phase reference signal A. As shown in FIG. 2, the drive circuit can be of the Walsh function type including a plurality of flip flops, a plurality of open collector buffer inverters whose outputs are current summed, and first and second filter circuits to remove high frequency components of generated stepped sine and cosine waves. Driver circuits of other configurations can be used so long as they provide sine and cosine waves that are phase locked and of equal current amplitude. Due to its motion relative to the stator windings, the rotor winding generates a sine wave having a frequency determined by the magnitude of that relative motion. The rotor winding signal, after being filtered to remove noise, is amplified by amplifier 18 and then supplied to a squaring circuit 20 of conventional design. Squaring circuit 20 is a high speed comparator which produces a square wave signal having a phase corresponding to that of the rotor signal. A square wave signal is needed since the phase detectors 22, 23, 24, 25 used herein are of the exclusive OR type which operate most effectively with square wave inputs having good sharp edges with minimum jitter.

The phase reference signal A is supplied to a conventional shift register 26 which produces a first output corresponding to its input with no phase shift, a second output shifted 45° relative to the input signal, a third output shifted 90° relative to the input signal, and a fourth output shifted 135° relative to the input signal. Each of the four outputs of shift register 26 is supplied to one of the phase detectors 22, 23, 24 and 25 which also receive the output of squaring circuit 20. The outputs of the phase detectors are high frequency rectangular pulses that are duty cycle or width modulated, that is, the outputs have an amplitude at the logic level, a width or period indicative of the phase relationship between its inputs, and a duty cycle determined by the carrier frequency. Those outputs have several frequency components, one of which is a low frequency component which is the desired position signal and other unwanted high frequency carrier frequency components that are filtered out by filters 34, 35, 36 and 37. Buffers 38, 39, 40 and 41 receive the outputs of filters 34, 35, 36 and 37, respectively, the buffering being needed to drive a low load impedance through the filters. Thus, the low frequency output signals of the buffers are triangular shaped position signals at relative phases of 0°, 45°, 90° and 135°, with the position signals having a frequency which is a function of the phase relationship between the inputs to the phase detectors.

The four phases of the position signal, that is, 0°, 45°, 90° and 135°, can be used to provide a signal having an amplitude at all times directly proportional to the velocity of the rotor. That is achieved by generating a first velocity signal from the 0° position signal, a signal that is an inversion of the first velocity signal, a second velocity signal from the 90° position signal, and a signal that is an inversion of the second velocity signal. Accordingly, the output of buffer 38 is supplied to a differentiator circuit 50 to produce a velocity signal "a" and that velocity signal "a" is supplied to an inverter 51 to produce a velocity signal "b" which is velocity signal "a" inverted. Likewise, the output of buffer 40 is supplied to a differentiator circuit 52 to produce a velocity signal "c" and that velocity signal "c" is supplied to an inverter 53 to produce a velocity signal "d" which is velocity signal "c" inverted. As is well known, the rate of change of a position signal is indicative of velocity and, accordingly, the velocity signals "a" and "c" being derived from triangular shaped position signals have substantially square wave shapes with a frequency equal to the frequency of the position signals and an amplitude corresponding to the rate of change of the amplitude of the position signals.

As noted, the velocity signals are only substantially square wave shaped since they are derived from position signals that have somewhat round peaks due to the bandwidth limited nature of the circuit. More exactly, the velocity signals will be more trapezoidal and to get a velocity signal having an amplitude at all times directly proportional to the velocity of the rotor, the flat plateau portions of the velocity signals "a", "b", "c" and "d" must be sequentially sampled. Accordingly, the four velocity signals are supplied as four inputs to a synchronous rectifier 58, that is, an analog multiplexer. Supplied also to synchronous rectifier 58 are the 45° and 135° position signals. The 45° and 135° position signals act as sampling controls and determine when each plateau portion of each of the four velocity signals is to be sampled. Thus, the composite output signal of synchronous rectifier 58, after filtering by filter 61 to remove high frequency glitches due to sampling, is a signal "e" having an amplitude at all times directly proportional to the velocity of the rotor. The polarity of the velocity signal provides an indication of the direction of rotation of the rotor. Further details for the generation of the position and velocity signals is contained in a concurrently filed application entitled "Transducer System With Increased Tracking Capability", with common inventorship to this application.

In order to determine the track to which the read/write head must locate, a conventional control unit stores the location of the present head position and then instructs the system by means of a different count how many data tracks the head must traverse to reach a desired data track. That initial difference count is stored in a counter 59. In a conventional manner, the counter 59 is decremented one count for each data track traversed by the read/write head. Counting of the tracks traversed can be achieved by supplying the 90° position signal to a zero crossing detector 44, with the output of detector 44 being supplied to the counter 59 to achieve decrementing of the same.

Figure 3:
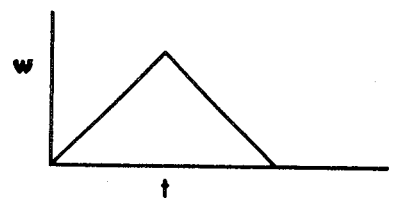
FIG. 3 is a time optimal acceleration/deceleration profile.
Figure 4:
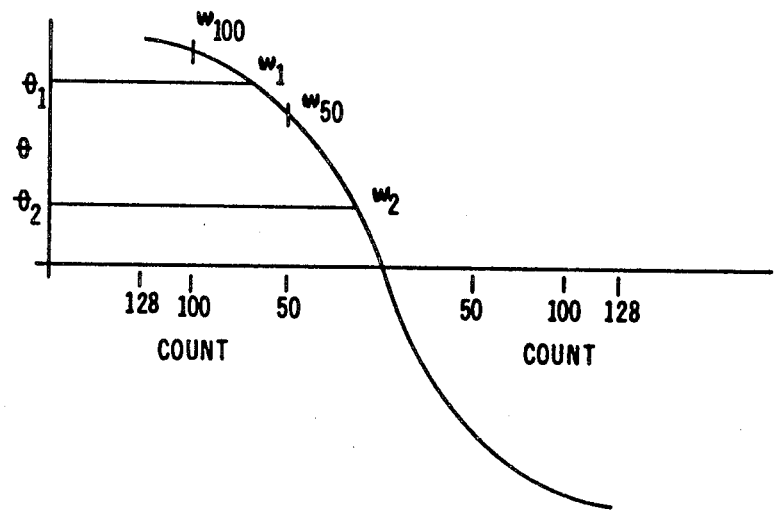
FIG. 4 is a square root velocity profile curve in relation to track count.

The actual velocity signal "e" is supplied to one input of a summing network 60, the output of which is supplied to motor driver 62. During track seeking, a reference velocity signal is supplied to a second input of summing network 60. The reference velocity signal is provided by the output of a look up table 64 in accordance with the number of tracks remaining to be traversed to arrive at the desired track. To achieve that output, the decrementing track count signal is supplied to the input of look up table 64. Regarding the nature of table 64, for minimal motion time from one track position to another track position, it is desirable that the head support have constant acceleration for the first half of the time and constant deceleration for the second half of the time. Such a time optimal profile is shown in FIG. 3. For a rotory system:

$$\theta = \tfrac{1}{2}\alpha t^2 \quad (1)$$

and $$\omega t = \theta \quad (2)$$

where $\theta$ = angle in radians, $\alpha$ = angular acceleration in radians per second squared, t = time and $\omega$ = velocity in radians per second, substituting equation (2) into equation (1) yields:

$$\omega = \sqrt{2\alpha\theta} \quad (3)$$

for the time optimal velocity profile. Since optimal velocity is related to position as a square root function, the velocity signal profile stored in table 64 is optimally a square root function in relation to the track count as shown in FIG. 4 wherein track count is shown for a square root velocity curve. Thus, for each track count value supplied to the look up table 64, a corresponding velocity signal is outputted by the table in accordance with the curve of FIG. 4. For example, if the first output of the counter is 100, the square root look up table would output $\omega_{100}$. As the output of the counter decrements towards zero, the square root table would output a digital signal representative of the value of $\omega$ corresponding to the decreasing track count, for example, count 50 would output $\omega_{50}$.

Regarding table 64, it utilizes 8 bits to provide 256 memory locations, that is, decimal 0 to decimal 255, and since we desire it to be bi-polar to track movement in both directions, we make the center of the table or velocity curve the zero or null velocity value, with positive velocity above the center and negative velocity below the center. Also, there are 128 clock positions on each side of the null velocity value. Each digital signal supplied to the table has a corresponding value from the square root curve. Table 64 can be a ROM portion of a microprocessor which would also generate some of the control signals referenced.

The digital output signal of table 64 is supplied in parallel to the input terminals of a conventional digital to analog converter 66 which outputs an analog signal of a magnitude relating to the digital input signal thereto. That analog output is supplied via a resistor 68 to the second input of summing circuit 60 as the reference velocity signal. Summing circuit 60 sums the two signals supplied thereto, that is, the actual velocity signal and the reference velocity signal, to provide the drive signal for motor drive 62.

As stated, motor drive 62 is driven in accordance with velocity signals derived in part from track count as the counter decrements due to movement of the head support toward the desired track. When the counter has decremented to zero, the head support is still a fraction of a track from the desired track. Since with a fraction of a track yet to go the head support does not have zero velocity, that is, it has a velocity error and a corresponding position error, if the system were placed in the position mode there would be a settling problem. Track count can no longer be used for positioning since the count is zero. However, a linear signal related to position is available, that is, the triangular position signal and the amplitude of that linear position signal is now used for positioning. Accordingly, when the track count has decremented to zero, a control signal is generated which gates closed both a switch 70 which permits the position signal to be supplied to a conventional analog to digital converter 76 and a switch 72 which provides a current path to ground through a resistor 74. Both switches can be FET's.

Converter 76 can be a conventional 8 bit successive approximation type converter for fast operation which outputs an 8 bit digital signal in accordance with the magnitude of the position signal supplied thereto. The output bits of converter 76 are supplied in parallel to look up table 64 which this time uses the velocity curve of FIG. 4 and position signal amplitude to generate a digital signal representative of desired reference velocity. For example, referring to FIG. 4, if the amplitude of the position signal is $\theta_1$, a signal representative to velocity $\omega_1$ would be outputted by the table of FIG. 4, and if the amplitude of the position signal is $\theta_2$, a signal representative of velocity $\omega_2$ would be outputted by the table of FIG. 4. The digital outputs of table 64 are again supplied to digital to analog converter 66 and the resulting analog signal supplied by resistor 68 to the summing circuit 60. All of the curve of FIG. 4 is utilized in the position mode operation even though the track count is zero because, as noted, resistor 74 and switch 72 provide for the first time an additional current path when the track count decrements to zero and that action effectively changes the scale of the digital to analog converter 66. For example, resistor 68 can be 50K and resistor 74 can be 5K.

Thus, as the triangular position signal decreases towards zero, the reference velocity signal also decreases towards zero. When the position signal reaches zero, the output of the analog to digital converter 76 is also zero. The system is thus relating that there is no position error and table 64 accordingly outputs a signal indicating that there is no velocity error. Accordingly, the head support is stopped at the desired track with no settling problem. Since the square root velocity curve is bi-polar, that is, has positive $\omega$ and negative $\omega$ values, should the head support move beyond the null position or overshoot, a signal would be generated to move it back to the null position. When the position signal reaches zero, the switch 90 is moved to its lower position whereby the position signal is supplied directly to summing network 60 to provide system stiffness.

The circuit described for eliminating settling problems is component efficient due to the fact that it uses the same look up table and digital to analog converter with scale changed for providing a velocity reference signal from either track pulses or from the position signal. The invention has been described in terms of a closed looped servo system which employs a torque motor. If a stepper motor is provided with a means for position and velocity feedback, the same technique may be applied by use of pulse-width modulation of the stepper motor drive. Also, the position signal could be in the form of a sine wave, in which case the square root table would be of a design that would convert the amplitude of the sine wave signal to a velocity signal.

I claim:

1. A closed loop servo system for moving a member past a plurality of positions to a desired position, comprising:
    counting means for supplying a count signal indicative of the number of positions which said member must pass to reach said desired position;
    first means for generating a first signal indicative of the position of said member;
    a motor drive;
    a storage device;
    means for supplying said count signal to said storage device;
    means for supplying a digital representation of said position signal to said storage device only when said count signeal is zero;
    said storage means outputting a digital signal indicative of the reference velocity of said member in response to either input thereto:
    a digital to analog converter coupled to the output of said storage means and outputting an analog signal indicative of the reference velocity of said member;
    means for changing the scale of said converter when said digital representation of said position signal is being supplied to said storage device; and
    means for supplying said position signal to said motor drive only after said storage device is receiving said digital representation of said position signal and said position signal is at a reference amplitude.

2. A closed loop servo system for moving a member past a plurality of positions to a desired position, comprising:
    counting means for supplying a count signal indicative of the number of positions which said member must pass to reach said desired position;
    first means for generating a signal indicative of the position of said member;
    a motor drive;
    second means for supplying to said motor drive a reference velocity signal first derived from said count signal and then derived from said position signal, said second means includes an analog to digital converter, a look up table coupled to the outputs of said converter, and a digital to analog converter coupled to the outpus of said table, said look up table receiving as an input said count signal and said analog to digital converter receiving as an input said position signal; and third means for supplying said position signal to said motor drive only when said position signal is at a reference amplitude.

3. The servo system of claim 2 in which said second means further includes means for effectively changing the scale of said digital to analog converter when said reference velocity signal is being derived from said position signal.

* * * * *